United States Patent

Goldstein et al.

[11] Patent Number: 5,809,469
[45] Date of Patent: Sep. 15, 1998

[54] METHOD AND DEVICE TO INPUT CHARACTERS

[75] Inventors: Mikael Goldstein, Stockholm; Mikael Lockner, Danderyd, both of Sweden

[73] Assignee: Telia AB, Farsta, Sweden

[21] Appl. No.: 549,203

[22] Filed: Oct. 27, 1995

[30] Foreign Application Priority Data

Sep. 15, 1995 [SE] Sweden ................................... 9503211

[51] Int. Cl.⁶ ...................................................... G10K 3/00
[52] U.S. Cl. ............................. 704/270; 379/88; 704/278
[58] Field of Search ................................. 379/67, 74, 77, 379/88, 90, 97; 395/2.79, 2.69, 2.84

[56] References Cited

U.S. PATENT DOCUMENTS

| | | | |
|---|---|---|---|
| 4,899,369 | 2/1990 | Kondziela | 379/101 |
| 5,031,206 | 7/1991 | Riskin | 379/97 |
| 5,193,110 | 3/1993 | Jones et al. | 379/94 |
| 5,218,708 | 6/1993 | Kanbayashi et al. | 395/800 |
| 5,236,199 | 8/1993 | Thompson, Jr. | 273/439 |
| 5,309,504 | 5/1994 | Morganstein | 379/67 |
| 5,386,494 | 1/1995 | White | 395/2.84 |
| 5,604,921 | 2/1997 | Alanara | 455/45 |

*Primary Examiner*—David R. Hudspeth
*Assistant Examiner*—Michael N. Opsasnick

*Attorney, Agent, or Firm*—Oblon, Spivak, McClelland, Maier & Neustadt, P.C.

[57] ABSTRACT

A method and device for inputting characters. An answering equipment, Ts, answers a call from a terminal equipment, Te. The answering equipment transmits a sequence of characters which can consist of letters, digits or other characters. The information is transmitted via the telecommunications network to the terminal equipment where the information is read out in a loudspeaker which is listened to by a subscriber. When the subscriber hears the character in question being read, he/she presses a key on the terminal equipment. The key can be one of the keys on the ordinary keypad of twelve keys on the telephone. The signal passes to the answering equipment where it is identified and registers that the character in question shall be stored in a data base, DB. The data base stores the character and combines the other characters which are input, and predicts which possible words or character combinations remain, depending on application. When the number of possible combinations is lower than a predetermined number, the system changes to read out current character combinations or words. The subscriber confirms which characters or character combinations or words are intended. When a word or a character combination has been completely identified, this is used for transmitting the information to the subscriber. The current information can for instance refer to the owner of a car with a certain car number, or the telephone number of a wanted person etc.

21 Claims, 2 Drawing Sheets ions or words.

METHOD AND DEVICE TO INPUT CHARACTERS

BACKGROUND OF THE INVENTION

1. Field of the Invention

The present invention relates to the input of characters or character combinations in a system which analyzes input characters for identification of searched character combinations or words.

2. Description of the Background

At the input of alphanumerical information there are at present the following alternatives:

A. Input is made via a keyboard containing most of the alphanumerical characters.

B. The user pronounces the letters/words which are registered by a speech recognition equipment.

C. By input of two-digit numerical codes which are registered as characters.

In the known methods which so far have been used, the generation of characters and the control of these has been focused to the user. Within for instance telecommunications this is a disadvantage from the user's point of view.

When generating letters and figures in a telecommunications system a keyboard comprising most alphanumerical characters has to be exchanged. The exchange is expensive and the users will perhaps not see any advantage in acquiring such keyboards for services which are sparsely used. Also the exchange of telephones is expensive. For mobile users an extra keyboard furthermore is a drawback which can hardly be accepted.

Voice control is a technology which is expected to be usable in the future. The voice recognition technology implies that a voice recognition equipment is taught to recognize a number of words and expressions in a language. With present technology, however, only speech from persons who are within the scope of the voice recognition equipment's limits will be recognized. Difficulties can further exist to correctly recognize speech in a noisy environment, or in an environment where there is other speech in the background. The incorporation of voice recognition equipment in telecommunications systems, or other systems, is also expensive.

The representation of letters as two digit codes is in itself possible but not user-friendly. In order to use two-digit codes, manuals which indicate which characters correspond to which characters are required. Furthermore the figure codes will be extensive if both capitals and lower-case letters shall be represented. Further there may be a need for recognition of different punctuation marks, apostrophes, special characters in different languages etc.

Furthermore, it should be possible to use system for recognition of characters in languages which do not use the latin alphabet. Consequently the system should be able to use for Cyrillic letters, Chinese characters etc.

SUMMARY OF THE INVENTION

The object of the present invention is to solve the above mentioned problems.

The present invention relates to a method inputting of characters via a terminal. A receiving equipment identifies the characters corresponding to the input at conversation with a terminal equipment. For that purpose the receiving equipment produces a verbal sequence of characters. The sequence is transmitted to the terminal equipment from where control signals are transmitted for activation of the receiving equipment's transmission of the verbal sequence. For instance rapid winding/rewinding, the succession of the characters, confirmation that a searched character has been found etc, can be transmitted. When the receiving equipment receives the control signal that the character has been found, this is registered by the receiving equipment and the characters are put into the system.

The characters which are transmitted from the receiving equipment are verbally reproduced by the terminal equipment. The control signal is further produced via a keypad on the terminal. The keypad is restricted to, for instance, the twelve keys of the telephone.

For initiation of a certain function at the receiving equipment, for instance rapid winding/rewinding and confirming of symbol etc, a predefined key is pressed. At this, for instance, five can correspond to a confirm symbol, four rapid rewinding, six rapid winding, eight search etc. The reproduction of the characters can relate to single letters, digits and/or syllables and/or whole words. The characters put into the receiving equipment are further used for prediction of possible character combinations that can exist. For example, it is described the prediction which characters can be obtained after previously put in characters, or the frequency of the presence of different characters after the previous inputs. After that, in the receiving equipment characters are produced which can exist in the indicated connection. Characters which cannot exist are excluded, and characters which occur rarely in the combination in question may be reproduced less frequently. From the analysis of the entered characters, it is further predicted which possible combinations of characters remain. The receiving equipment further changes from generation of single characters to combinations of characters, when a predecided number of character combinations exist. The character combinations can for instance consist of whole words or syllables when the possible combinations are below a maximum number, for instance ten. The receiving equipment can further be arranged to skip or reproduce certain characters/character combinations less frequently, depending on the occurrence of the character/character combination in a current application. The control signals further can be used for selection of set of characters, for instance letters, digits or other symbols. The characters are further arranged in sequence and the choice of control signal controls the reproduction of the characters. The receiving equipment consists of a telecommunications system, and the terminal equipment consists of a terminal connected to, or connectable to, the telecommunications system.

The device further relates to a device for input of characters. A terminal equipment is arranged to enter the characters. A receiving equipment is further arranged to identify and store corresponding characters the input characters. In the receiving equipent is produced a sequence of characters which is verbally reproduced in the terminal equipment. From the terminal equipment are transmitted control signals to have an effect on the character sequence. The control signals are further used to indicate when a searched character/character combination is identified, at which point the receiving equipment combines the different characters and identifies words or combinations of characters which are searched. Arranged keys on the terminal are used to transmit the control signals. The keypad is limited, to, for instance, the twelve keys an the telephone.

A pressing of a key in the keypad initiates a predetermined function at the receiving equipment. The function can for instance consist of rapid winding/rewinding, confirmation of character and/or combination of the characters etc. The verbal reproduction of the characters is intended to be reproduced as letters/digits and/or syllables and/or words. The receiving equipment further predicts possible character combinations on the basis of previously input characters. The receiving equipment further generates character combinations or whole words when the number of character combinations/words is lower than a predetermined number, for instance ten. Characters or character combinations which occur less frequently or do not exist in the language, or in certain connections, are reproduced less frequently or are skipped. The character, the character combination and/or the words are arranged in sequences, for instance in alphabetical order, numerical order etc. The reproduction of the characters are controlled by the control signals. The receiving equipment is further included in a telecommunications system, and the terminal equipment is included in, or is connectable to, a communications equipment, for instance a telephone which is connected to, or connectable to, a telecommunications system.

The present invention consequently provides for inputting characters in a system without utilizing of a complete alphanumerical keyboard. The invention further allows that different key sets can be entered without changing the present keyboard on the terminal equipment. The procedure for input of characters is further simple and can be performed by anyone. Expensive investments in equipment on the user side, respective on the information supplying side, is further reduced to a minumum.

The invention is further usable at both stationary telephones and mobile telephones when the invention is used in connection with telecommunications. By the fact that the invention predicts the characters or respective character combinations which can occur on the basis of previously input character combinations, also the speed with which the input is performed will increase. The invention further is usable in a number of applications. In connection with telephony the twelwe keys of the telephone can for instance represent different functions at the controlling of character generation. In other connections more or fewer keys can be used due to the application.

DETAILED DESCRIPTION OF THE PREFERRED EMBODIMENTS

Figure 1:
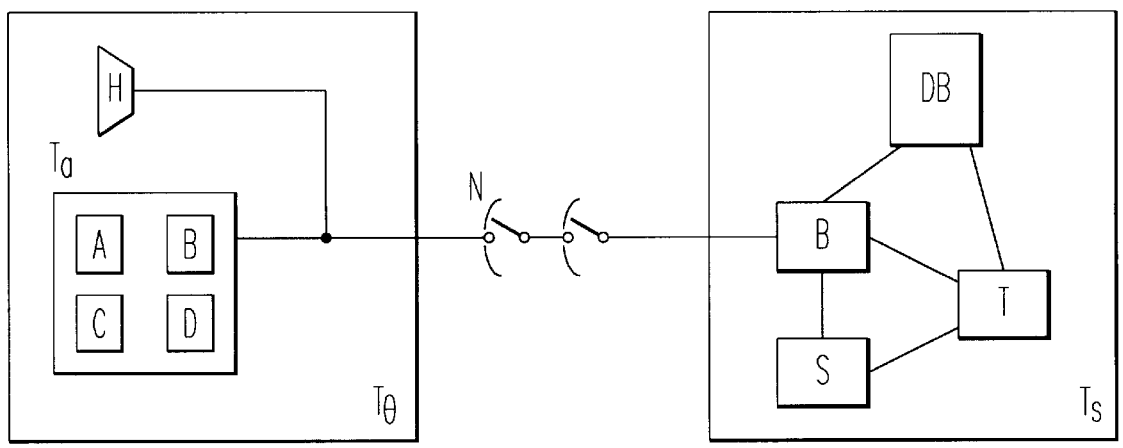
FIG. 1 shows the invention in a telephone network with stationary connections.
Figure 2:
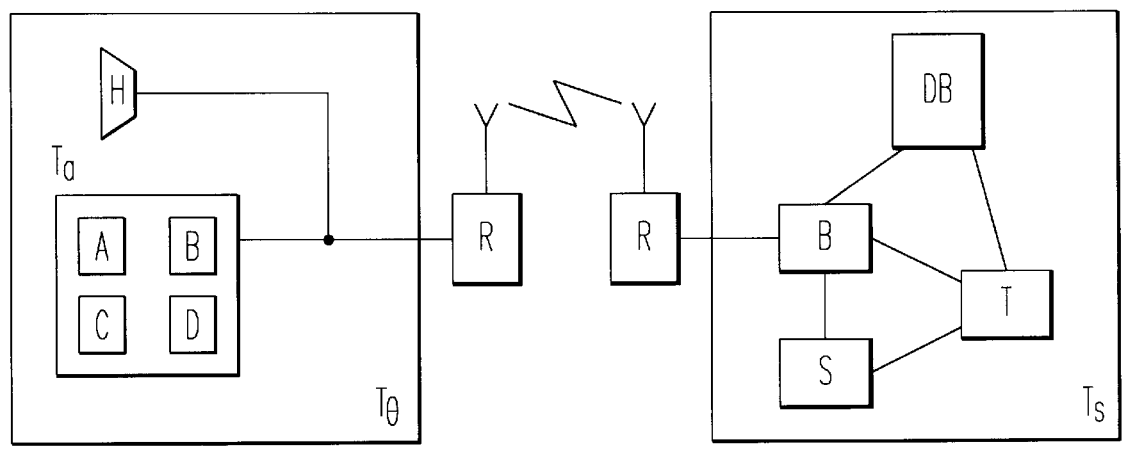
FIG. 2 shows a corresponding system in connection with radio communication.
Figure 3:
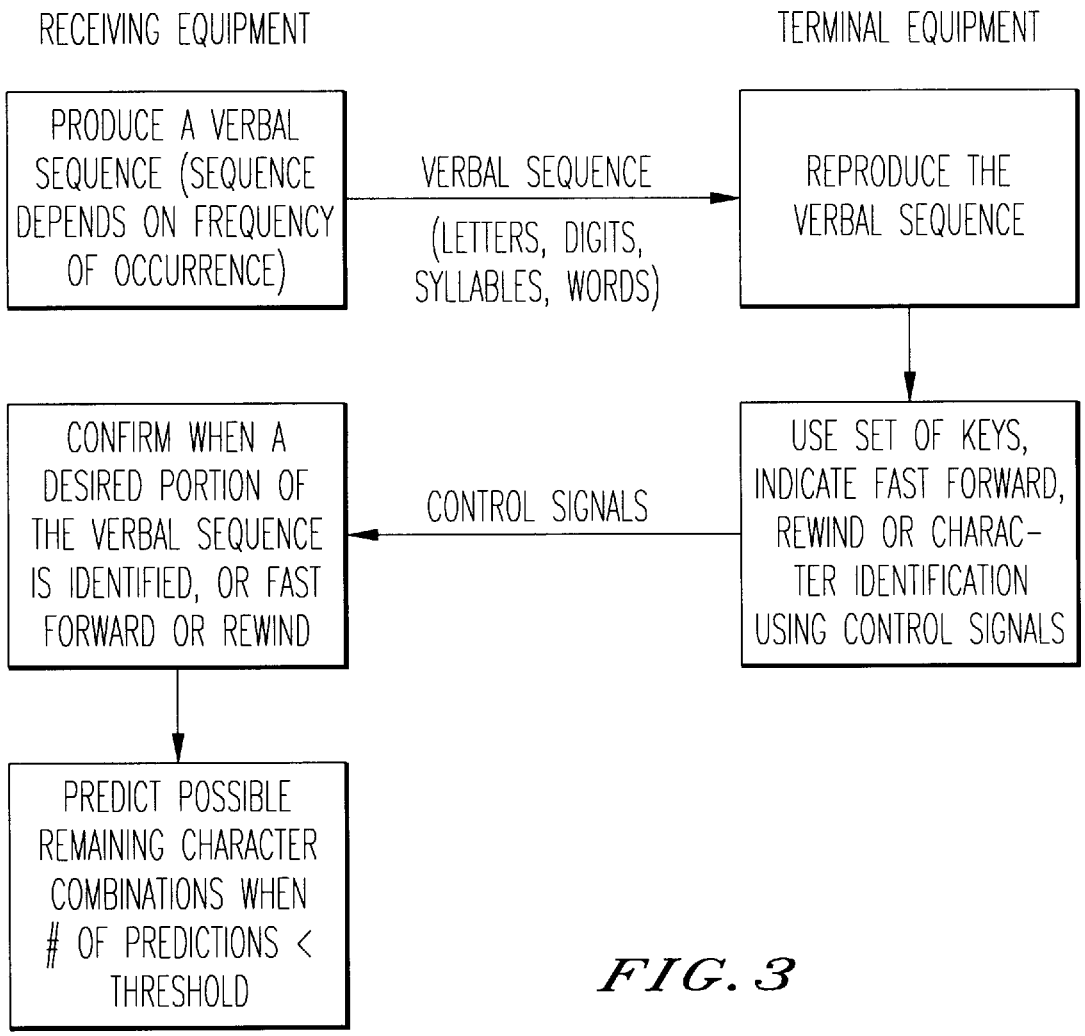
FIG. 3 is a flowchart depicting an operation of an embodiment of the present invention.

In the following the invention is described on the basis of the figures, the terms therein and on the basis of telecommunications systems. The invention can of course also be used in other contexts.

In a customary way, a user establishes contact with another subscriber in a telecommunications network. The user is using a telecommunications equipment, Te, which is equipped with a keyboard, Ta, equipped with a number of keys, A, B, C, D etc. In addition the terminal equipment is equipped with a speaker device, H. The terminal equipment is further connected to a telecommunications network, N, or a radio network, R. The subscriber is connected to in a customary way in the telecommunications network. Call signals are transmitted to the subscriber who automatically answers the call. The answering equipment, Ts, accordingly answers the call and transmits a message which can be verbal or consists of tones, to the calling subscriber. Depending on which function or functions are present in the built-in answering equipment, an inquiry is translated to the calling subscriber regarding which function is to be used. The answering equipment can at that point indicate a number of functions which are available, at which point the calling subscriber, via his terminal equipment, Te, confirms which of the functions is wanted by pressing one of the keys A, B, C etc, on his keyboard. The answering equipment, Ts, after that activates the searched functions and databases in question in the answering equipment. The answering equipment after that activates a device, B, which reads the characters in question in succession.

The reading of characters for instance relates to the alphabet for which point the reading normally is made, e.g., from a to ö. The reading can further relate to digits, punctuation marks, apostrophes etc. The reading can further be made application specific and relate to different alphabets or different character systems. The information is after that transmitted via the telecommunications network to the terminal equipment where the information is read via speaker, H. The subscriber at the terminal equipment, Te, after that listens in to the reading of characters until the character in question is read, at which he/she presses one of the keys A, B, C or D. If, for instance, the key A is pressed, it is confirmed that the last read character shall be registered. The signal from the key A is transmitted via the telecommunications network to the answering equipment, Ts. In the answering equipment the keystroke is registered at the terminal equipment, Te. A control equipment, S, receives the signal and registers that the character in question has been registered. A signal is at that point transmitted to the device, B, which reads the character at which point the reading of characters is interrupted. Moreover, signals are transmitted between the control equipment respective the equipment for reading of characters to a data base, DB. In the data base are registered which characters have been registered. After that, a check is made in the data base against the application, T, regarding which characters can follow the registered character. The data base after that transmits information to the device, which reads the characters regarding which characters shall be read next. At that point, for instance, the whole alphabet from a to ö can be read, or some characters which can not occur before the first input character can be excluded. If, for instance, the first input character consists of a p, it does not normally happen that the letters b, c, d, g occcur immediately after the first mentioned letter. Owing to this, the data base indicates to the device for reading of characters that the mentioned character shall be excluded at the continued reading of characters. Other characters, as for instance s, seldom occurs in combination with p as first letter in Swedish words. For this reason the database further indicates that s shall be read less frequently than other remaining letters. The reading is after that performed in a corresponding way as has been previously described, at which point the subscriber again presses the key, A, when the next character in the character combination is read. After that a second character is registered to the data base in the same way as the first character. The character combination is further examined against the contents in the data base, at which possible words, names, character combinations etc, are examined. In the data base is further performed an examination of which whole words or character combinations remain and are allowed. If, for instance, the number of the words and character combinations is lower than a predetermined threshold, this is registered in the data base. From the data base is after that transmitted information to the device for reading of characters with an indication of which words/character combinations shall be read. When the subscriber at the terminal equipment, Te, catches the word/character combination, he/she again presses the key, A, at which, in a corresponding way as previously described, it is registered in the answering equipment. When the whole word/character combination is registered, information is transmitted from the data base, DB, to the application in question, T. The application can for instance consist of a telephone directory where the number of a certain subscriber is identified, or inputs in a car register, where the car number in question is used for identification of the owner etc. If it is supposed that the information is related to a car register, each character combination is unique and appoints only one owner. The information in question is pointed out in the data base and is transmitted to the owner for reading of the character which at that point reads the current information which is being listened to in a speaker in the terminal equipment, Te. When the subscriber at the terminal equipment, Te, does not catch the information, the subscriber can for instance press the key, B, at which point the signal is transmitted to the answering equipment, Ts, where the control device registers the transmitted signal and indicates to the device for reading of characters that the information shall be repeated.

In a further development of the equipment, the keys, A, B, C, D etc, on the terminal equipment can be developed into a more sophisticated control means. If we at that point suppose that a subscriber from the terminal equipment, Te, calls the answering equipment, Ts, the call is answered in a corresponding way as has previously been described. The subscriber at the terminal equipment, however, knows that the character in question occurs at the end of the character sequence. For this reason he presses for instance the key C, a short moment. The information is transmitted via the telecommunications network to the control system in the answering equipment, which registers the pressing. The control system after that transmits a signal to the device for reading of characters, at which the reading of the alphabet is made for example by reading from the end, i.e. ö, ä, å etc. The subscriber at the terminal equipment after that acts as has previously been described to identify and confirm which characters are searched for. Further, the subscriber at the terminal equipment, Te, can by pressing the key C a number of times in sequence, obtain rapid rewinding a certain number of characters back. By a corresponding pressing of the key, D, a number of times, in a corresponding way, a rapid winding is achieved. The signal is also in this case registered in the control equipment, which in a corresponding way as previously described transmits the information to the device for reading of the text, which at this winds rapidly to the searched position from which the reading of the characters proceeds. Depending on the fields of application, respective which functionalities point are wanted, the keyboard of a telephone can be used for different control functions. The control is at that performed in a corresponding way as has previously been described, at which the control equipment registers which control signals have been received and performs the different maneuvers in the answering equipment.

What has been described above consequently gives a solution to the letter and word recognition problems for instance for audio response services which require alphanumerical information. The device is based on two metaphores, the recorder metaphor and the alphabet metaphor. By metaphor is meant that one uses a simile to a phenomenon which is previously known. By the recorder metaphor we mean the way that a recorder is controlled. There is usually a key for rapid rewinding and another key for rapid winding. The recorder metaphor is useful to be referred to when one rapidly will go forward or backward in an amount of information.

The alphabet is something that most people know and have been programmed with wherever they are. Our language is based on the knowledge of the alphabet. Most people can rattle off the alphabet from a to ö, whereas they, on the contrary, have difficulties in rattling it off in reverse order. The alphabet metaphor has the advantage that everybody knows it and are confident with how it works.

According to the invention there exists consequently two metaphors in combination. When one makes use of a service in for instance a telecommunications network or a screen-based service as for instance text-TV, which requires letter/word/name-information, one makes the system generate the characters in the alphabet/words/names instead of having these generated by the user.

The previously indicated way is based on the fact that the control is focussed on the user, whereas the basis of the invention is a more passive attitude from the user's point of view. When letter information is required, the system quite simply starts reading out the alphabet "A, B, C, etc". When the user catches the letter which corresponds to the first letter in the word/name he/she is searching he/she presses the confirmation key, for instance # (pound key).

The function interface of the invention at the keyboard with twelve keys on the telephone is quite in accordance with the function interface that is valid for voice answering services of message type, new mobile answer and tele answer. In addition to the confirmation key, pound key, the device makes use of the recorder metaphor which in the function interface uses the keys seven and nine, wind rapidly and rewind rapidly. If one wants to get hold of the letter v, this means that one listens in to the first letter, then one presses the nine four times in sequence. Then one will land up on the letter v where one presses the confirmation key, pound key. After that the system starts reading the alphabet again from the beginning, and one can via the recorder metaphor again jump to the second letter in the word/name one is looking for.

When the number of alternatives is getting small, the system can be programmed to read out the word/names instead. Also in this case the recorder metaphor can be used in a similar way; when the word/name is heard, one presses the pound key.

That the alphabet contains twenty-eight letters may seem a bit extensive. One should however remember that not all letters are used in most applications. The car registration plates, for instance, do not use the letters I,W and Å,Ä Ö. Regarding halting-places, names beginning with W, Q, Z, and also C are unusual in Swedish, which reduces the number of letters to twenty-three or less in the two applications. This leads to a more rapid searching for right letter/word/name.

For different kinds of information services which requires alphanumerical information, the invention can turn out to be perfect. One can for instance in a simple way use alphanumerical information in order to get information about who is the owner of a car by putting in the first three letters of the car number.

For information services of type SL:s traffic answer, or Vaxholmsbolagets timetables, one can indicate the first letter of the station one wants to go to (for instance B as in Båsut). If the number of stations beginning with B in the Stockholm region is less than for instance six, the names of the stations are read out, and when the right station name is heard, the user presses the pound key. To put in arrivals and departures is more simple, because these are already represented as figures on the keypad.

The invention has a lot of advantages. It is cheap to implement. It takes into consideration all mobile telephone users. It utilizes the existing twelve key terminal interface to the fullest extent. No new investments need to be made from customers point of view to put in alphanumerical information in a neat and simple way, but the frequency of use is the only factor affecting the costs. The more times one uses the system, the more it will cost.

The invention is further based on the same function interface and is used within the same recorder metaphor as the other voice answering services of the telecommunications, which implies that the user need not learn a new function interface. If the user has once learned to use a service with the above described function interface, he/she can in principle use all the others. The advantage with the invention is further that a manual or an instruction containing codes for the stations becomes quite unnecessary with increased usefulness and use.

The potential for the invention regarding future information and transaction services with well defined names and vocabulary is consequently very great.

The invention can be constructed for a transaction service where one at present with answering technique can buy/sell shares and options, as well as administrate one's share portfolio.

The invention is not restricted to the below indicated patent claims or what has been described above, but can be subjected to modifications within the frame of the idea of invention.

What is claimed as new and is desired to be secured by Letters Patent of the United States is:

1. A method to input characters at a terminal equipment, comprising the steps of:
   producing a verbal sequence in a receiving equipment;
   reproducing the verbal sequence in the terminal equipment;
   transmitting control signals from the terminal equipment to the receiving equipment to control at least one of fast forwarding and rewinding the verbal sequence by the receiving equipment;
   confirming in the terminal equipment when a desired portion of the verbal sequence has been found; and
   registering the desired portion of the verbal sequence at the receiving equipment.

2. The method according to claim 1, wherein the step of producing a verbal sequence comprises the steps of:
   transmitting the verbal sequence from the receiving equipment to the terminal equipment; and
   receiving the transmitted verbal sequence at the terminal equipment.

3. The method according to claim 1, wherein the step of transmitting control signals comprises the step of:
   producing the control signals via a set of keys in the terminal equipment.

4. The method according to claim 1, wherein the step of producing the control signals comprises the step of:
   producing the control signals using a set of twelve keys in the terminal equipment.

5. The method according to claim 1, wherein the step of producing a verbal sequence comprises the step of:
   producing a verbal sequence as at least one of a sequence of letters, digits, syllables and words.

6. The method according to claim 1, further comprising the step of:
   predicting, in the receiving equipment, possible remaining combinations based on the transmitted control signals.

7. The method according to claim 6, wherein the step of predicting further comprises the step of:
   generating a verbal character combination sequence when a number of possible remaining combinations is less than a threshold.

8. The method according to claim 1, wherein the step of producing a verbal sequence comprises the step of:
   reproducing at least one of certain characters and character combinations less frequently than others depending on an occurrence of the at least one of characters and character combinations in a field of use.

9. The method according to claim 1, wherein the step of producing a verbal sequence comprises the step of:
   arranging an order of the verbal sequence in response to the transmitted control signals.

10. The method according to claim 1, wherein the step of producing a verbal sequence comprises the step of producing a verbal sequence in a telecommunication system; and
    wherein the step of transmitting control signals comprises the step of transmitting control signals from the terminal equipment connected to a telecommunication system.

11. A system for inputting characters, comprising:
    receiving means comprising:
      means for producing a verbal sequence, and
      means for receiving a sequence of control signals for fast forwarding and rewinding the verbal sequence and for confirming a desired portion of the verbal sequence; and
    terminal means comprising:
      means for reproducing the verbal sequence produced in the receiving means,
      means for generating and transmitting control signals to control the sequence of characters produced in the receiving means, and
      means for confirming and transmitting a control signal when the desired portion of the verbal sequence is identified.

12. A system of claim 11, wherein the means for generating and transmitting control signals comprises:
    keys for generating said control signals.

13. A system of claim 11, wherein the means for generating and transmitting control signals comprises:
    twelve keys for generating said control signals.

14. A system of claim 11, wherein the receiving means further comprises:
    means for identifying a function to be performed by the receiving means based on the sequence of control signals received by the means for receiving.

15. The system of claim 11, wherein the means for producing a verbal sequence comprises:
    means for producing a sequence of at least one of letters, digits, syllables and words.

16. The system of claim 11, wherein the receiving means further comprises:

means for predicting character combinations based on the received sequence of control signals.

17. The system of claim 16, wherein the means for producing a verbal sequence comprises:

means for producing character combinations when a number of predicted combinations is less than a threshold.

18. The system of claim 11, wherein the means for producing a verbal sequence comprises:

means for producing at least one of characters and character combinations based on an occurrence frequency of the at least one of characters and character combinations in a field of use.

19. The system of claim 11, wherein the means for producing a verbal sequence comprises:

means for producing the verbal sequence in a predetermined sequence; and wherein the means for receiving a sequence of control signals comprises means for changing the predetermined sequence produced by the means for producing.

20. The system of claim 11, wherein the receiving means further comprises means for connecting to a telecommunication system and the terminal means further comprises means for connecting to the telecommunication system.

21. The system of claim 19, wherein the means for producing the verbal sequence in a predetermined sequence comprises means for producing characters in alphanumerical order.

* * * * *